(No Model.)

B. A. MOUNTS.
PLUMB LEVEL.

No. 449,557. Patented Mar. 31, 1891.

WITNESSES
A. J. Schwartz
J. F. Reily

INVENTOR
B. A. Mounts,
By W. S. Fitzgerald & Co.,
Attorneys.

UNITED STATES PATENT OFFICE.

BENJAMIN ANDERSON MOUNTS, OF CAIRO, ILLINOIS.

PLUMB-LEVEL.

SPECIFICATION forming part of Letters Patent No. 449,557, dated March 31, 1891.

Application filed October 28, 1890. Serial No. 369,552. (No model.)

*To all whom it may concern:*

Be it known that I, BENJAMIN ANDERSON MOUNTS, a citizen of the United States, residing at Cairo, in the county of Alexander and State of Illinois, have invented certain new and useful Improvements in Gravity Plumb-Levels; and I do hereby declare the following to be a full, clear, and exact description of the invention, such as will enable others skilled in the art to which it appertains to make and use the same.

My invention consists in a new and improved combined gravity plumb-level and rule, which is adapted to serve the purposes of a plumb-level or rule and to also take the place of the ordinary plumb-line, combining the two tools or instruments in one, and my invention will be hereinafter fully described and claimed.

Figure 1:
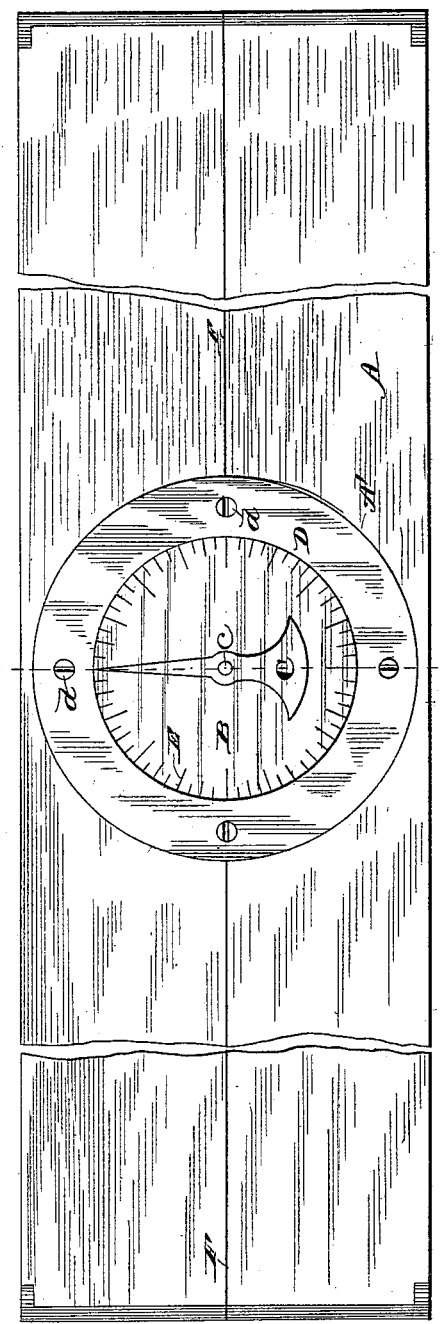
Figure 3:
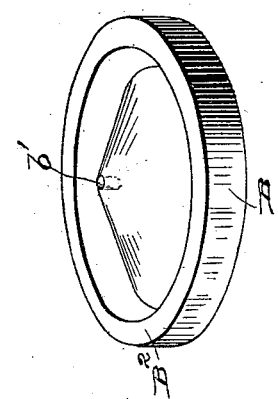
Figure 2:
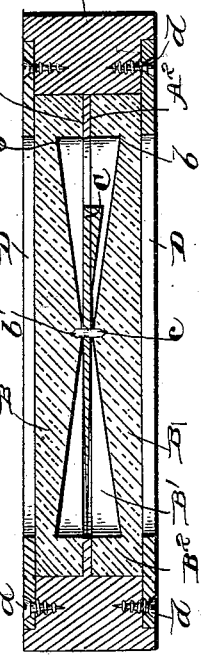

Referring to the accompanying drawings, Figure 1 is a side elevation of my new and improved gravity plumb-level. Fig. 2 is a central sectional view, on an enlarged scale, taken on line 2 2 of Fig. 1; and Fig. 3 is a perspective view of one of the glass disks, taken from the inner side thereof.

The same letters of reference indicate corresponding parts in all the figures.

Referring to the several parts by letter, A indicates a wooden rule, which is formed with the central opening A' in which the disks and weighted needle are mounted. The glass disks B B, which form both the bearing-disks for the weighted needle and the dials on which the said needle indicates the angle at which the rule is held, are formed with their outer faces level, while the inner side of each disk is formed with an annular recess B', which deepens from the center of the disk to the point $b$ near its circumference, leaving the inwardly-extending rim or flange $B^2$ around the circumference of the disk. At the center of each disk, on its inner side, is formed an aperture or recess $b'$. When the opening A' is formed in the rule A, a thin annular strip $A^2$ is left, as shown in the sectional view, Fig. 2, and when the disks B are placed in the opening B' from each side thereof their flanges $B^2$ come in contact with this strip. The weighted needle C is placed in position between the two disks, the ends of its central pivot $c$ fitting in the recesses $b'$ at the center of the two glass disks. The disks are then secured in position by the flat metal rings D D, which are held by screws $d$. Around the inner face of each glass disk B at the deepest point of its recess B' is marked in a circle a scale E, and these scales are of course visible through the transparent disks. Along the center of each side of the wooden rule is marked a longitudinal plumb-line F. It will now be seen that the weighted needle pivotally supported between the glass disks on which the scales are marked will turn by gravity, so as to always indicate on the scales E precisely the angle at which the rule is held; also, by holding the rule vertically with the point of the needle in line with the longitudinal plumb-line F on the side of the rule my device will serve and can be used for all the purposes of the ordinary plumb-line.

From the foregoing description, taken in connection with the accompanying drawings, it will be seen that my invention will serve the combined purposes of a spirit-level and a plumb-line combined in one compact form, the carpenter thus having the two tools in one. The peculiar construction of the glass disks B causes them to furnish a bearing to the weighted needle and also serve as dials, on which the scales are placed, over which the point of the weighted needle travels.

Having thus described my invention, what I claim, and desire to secure by Letters Patent, is—

1. The combination, with a rule having a central opening, of the two glass disks B, formed on their inner sides with the annular recesses B', which increase in depth as they extend outward and having the central recesses $b'$, and the weighted needle having the central transverse pivot fitting in the recesses $b'$ of the glass disks, substantially as set forth.

2. The combination of the rule formed with the central opening A and the annular strip $A^2$ in said opening, the glass disks B, formed on their inner sides with the annular recesses B', which increase in depth as they extend outward and having the scales E marked upon them, and the weighted needle pivotally supported between the glass disks, substantially as set forth.

In testimony whereof I affix my signature in presence of two witnesses.

BENJAMIN ANDERSON MOUNTS.

Witnesses:
ALBERT G. SCUDDER,
DENNIS J. FOLEY.